US008879654B2

(12) United States Patent
Hollis

(10) Patent No.: US 8,879,654 B2
(45) Date of Patent: Nov. 4, 2014

(54) COMMUNICATION INTERFACE WITH CONFIGURABLE ENCODING BASED ON CHANNEL TERMINATION

(75) Inventor: Timothy M. Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 1089 days.

(21) Appl. No.: 12/721,042

(22) Filed: Mar. 10, 2010

(65) Prior Publication Data
US 2011/0222623 A1 Sep. 15, 2011

(51) Int. Cl.
H04B 7/02 (2006.01)
H04J 11/00 (2006.01)
G08B 13/14 (2006.01)
H04L 25/49 (2006.01)
H04L 25/02 (2006.01)

(52) U.S. Cl.
CPC ......... *H04L 25/4915* (2013.01); *H04L 25/0272* (2013.01); *H04L 25/0292* (2013.01); *H04L 25/028* (2013.01); *H04L 25/0278* (2013.01)
USPC ......................... 375/267; 370/208; 340/572.7

(58) Field of Classification Search
CPC .............. H04L 25/028; H04L 25/0298; H04L 25/03343; H04L 7/0091; H04L 1/0026; H04L 2027/0018; H04L 12/40182
USPC ............................................ 375/267; 370/208
See application file for complete search history.

(56) References Cited

U.S. PATENT DOCUMENTS

| 6,362,644 | B1 | 3/2002 | Jeffery et al. | |
|---|---|---|---|---|
| 6,584,526 | B1 * | 6/2003 | Bogin et al. | .................. 710/124 |
| 6,670,828 | B2 | 12/2003 | Ramaswamy | |
| 7,501,963 | B1 | 3/2009 | Hollis | |
| 7,616,133 | B2 | 11/2009 | Hollis | |
| 7,769,077 | B2 * | 8/2010 | Bai et al. | ........................ 375/146 |

(Continued)

OTHER PUBLICATIONS

T. Hollis, "Data Bus Inversion in High-Speed Memory Applications," IEEE Trans. on Circuits & Sys., vol. 56, No. 4 (Apr. 2009).

*Primary Examiner* — Leon-Viet Nguyen
*Assistant Examiner* — Sarah Hassan
(74) *Attorney, Agent, or Firm* — Schwegman Lundberg & Woessner, P.A.

(57) ABSTRACT

An improved data transmission system is disclosed in which data encoding such as Data Bus Inversion (DBI) in a transmitting device is matched to the termination scheme being used in a receiving device. In the improved system, the transmitting device is able to automatically discover the termination scheme being used in the receiving device, and is thereby able to automatically implement a data-encoding algorithm to best match the termination scheme being used. In one example, Information concerning the termination scheme can be communicated to the transmitting device via a control channel, or another channel otherwise dedicated to data encoding such as a DBI channel. In another example, the transmitting device can infer the termination scheme being used via measurements, or by understanding how the receiving device will modify its termination scheme given current data transmission conditions. Alternatively, the receiving device is able to discover the data encoding scheme used in the transmitting device and is able to configure its termination circuitry accordingly.

31 Claims, 9 Drawing Sheets

(56) References Cited

U.S. PATENT DOCUMENTS

| | | | |
|---|---|---|---|
| 2004/0136465 A1* | 7/2004 | Hwang et al. | 375/267 |
| 2005/0141632 A1* | 6/2005 | Choi et al. | 375/267 |
| 2006/0182208 A1* | 8/2006 | Lee et al. | 375/347 |
| 2006/0193245 A1* | 8/2006 | Aghvami et al. | 370/208 |
| 2007/0126585 A1* | 6/2007 | Okunev et al. | 340/572.7 |
| 2009/0141564 A1* | 6/2009 | Pax | 365/189.08 |
| 2009/0313521 A1 | 12/2009 | Hollis | |
| 2010/0042889 A1* | 2/2010 | Hargan | 714/752 |

\* cited by examiner

US 8,879,654 B2

COMMUNICATION INTERFACE WITH CONFIGURABLE ENCODING BASED ON CHANNEL TERMINATION

FIELD OF THE INVENTION

Embodiments of this invention relate to a data transmission system in which data encoding in a transmitting device is matched to the termination scheme being used in a receiving device.

BACKGROUND

An example illustrating data transmission between high-speed components within a single semiconductor device, or between two devices in a communication system, is represented by the system 10 shown in FIG. 1. In FIG. 1, transmitter circuitry 12 within device 8 (e.g., a microprocessor) sends data over one or more communication channels 14 (e.g., conductive traces "on-chip" in a semiconductor device or on a printed circuit board) to receiver circuitry 16 within device 9 (e.g., another microprocessor or memory). As a group, such communication channels 14 are often referred to as a "data bus," which allows a group of data signals (e.g. a byte) to be transmitted from one device to another. Communication channels 14 are often two-way channels, and as such devices 8 and 9 would have both transmitter 12 and receiver 16 circuitry coupled to the channels 14; however this is not shown for convenience.

As discussed in U.S. Pat. No. 7,501,963 ("the '963 patent"), a data bus is susceptible to cross talk, simultaneous switching noise, intersymbol interference, and draws power based on the state of the data and/or frequency of data transition. One way to reduce these adverse effects and to prevent unnecessary power consumption is to encode the data. One specific form of data encoding that can be used is Data Bus Inversion (DBI).

Implementation of DBI includes encoding circuitry 13 in the transmitting device 8, which assesses the data bits (D1-Dn) (e.g., a byte) to be transmitted across the data bus and then decides, based on a particular DBI algorithm, if it would be advantageous to invert some or all of the data bits prior to transmission. If the data bits are inverted, an additional encoding indicator, referred to as a DBI bit, is also set at the DBI encoder 13 to indicate which data bits are inverted. Typically, as shown in FIG. 1, an extra channel 17 is needed so that the DBI bit may be transmitted in parallel with the data bits to inform receiving device 9 which groups of data bits have been inverted. Specifically, the DBI decoder 15 uses the DBI bit to return the incoming group of data bits (X1-Xn) to their original state (D1-Dn). Often, such decoding simply involves exclusive ORing the received data X1-Xn with the DBI bit.

Although not illustrated, another DBI approach involves calculating the DBI bit for each byte, but rather than sending the DBI bit in parallel with the byte over a DBI channel 17, sending a group of accumulated DBI bits simultaneously (e.g., a DBI byte) over the data channels 14 used for signaling. Such DBI byte can be sent either at the front or back end of the associated data signals. Using this DBI approach does not expand the pin count because a dedicated DBI channel 17 is not needed.

As pointed out in the '963 patent, there are several DBI algorithms known in the art. One DBI algorithm is referred to as the "minimum transitions" algorithm. While there may be variations of this technique, in general the minimum transitions algorithm begins by computing how many bits will transition during an upcoming cycle. When more than a certain number of transitions are predicted, the DBI encoder 13 inverts the data bits (D1-Dn), sets the DBI bit to a specified state (high or low depending on the implementation), and drives the inverted data bits and the DBI bit in parallel across the channels 14 and 17, with the DBI bit used to decode (i.e., de-invert) the inverted data bits at the DBI decoder 15 prior to use in the receiving device 9.

Two other well-known DBI algorithms include the "minimum zeros" algorithm and the "minimum ones" algorithm. The purpose of these algorithms is, respectively, to minimize the number of binary zeros or binary ones transmitted across the channel 14. Such algorithms conserve power when the transmitter or receiver circuits coupled to the communication channels are referenced to a particular power supply voltage through a resistor, and therefore will draw more power when transmitting or receiving a particular data state. For example, if a pull-up resistor connected to the high power supply voltage (Vddq) is used in a particular transmitter or receiver circuit, driving a logic '0' will require more power than would driving a logic '1'. In this instance, use of a minimum zeros DBI algorithm would be indicated to try and transmit as many logic '1' states across the transmission channels 14 as possible. Likewise, if a pull-down resistor connected to the low power supply voltage (Vssq) is used, a minimum ones algorithm would be indicated.

As communication systems grow more complicated, and become more configurable, it is becoming more complicated to pick a particular DBI algorithm that will be useful in all circumstances. For example, a manufacturer of device 8 may not necessarily know the type of device 9 that a particular system integrator might wish to couple to device 8. Or, device 9 may be variable in manners affecting the communication channels 14, in particular in the manner in which such channels are terminated. It is therefore difficult for the manufacturer of device 8 to provide a one-size-fits-all DBI solution. In fact, any particular data encoding algorithm chosen by the manufacture for device 8 could be counter-indicated by the particulars of device 9.

This disclosure presents a solution to such problems, and provides for devices with programmable DBI encoding algorithms dependent on the termination scheme used with a receiving device in the system.

DETAILED DESCRIPTION

An improved data transmission system is disclosed in which data encoding such as Data Bus Inversion (DBI) in a transmitting device is matched to the termination scheme being used in a receiving device. In the improved system, the transmitting device is able to automatically discover the termination scheme being used in the receiving device, and is thereby able to automatically implement a data-encoding algorithm to best match the termination scheme being used. In one example, Information concerning the termination scheme can be communicated to the transmitting device via a control channel, or another channel otherwise dedicated to data encoding such as a DBI channel. In another example, the transmitting device can infer the termination scheme being used via measurements, or by understanding how the receiving device will modify its termination scheme given current data transmission conditions. Alternatively, the receiving device is able to discover the data encoding scheme used in the transmitting device and is able to configure its termination circuitry accordingly.

Figure 2:
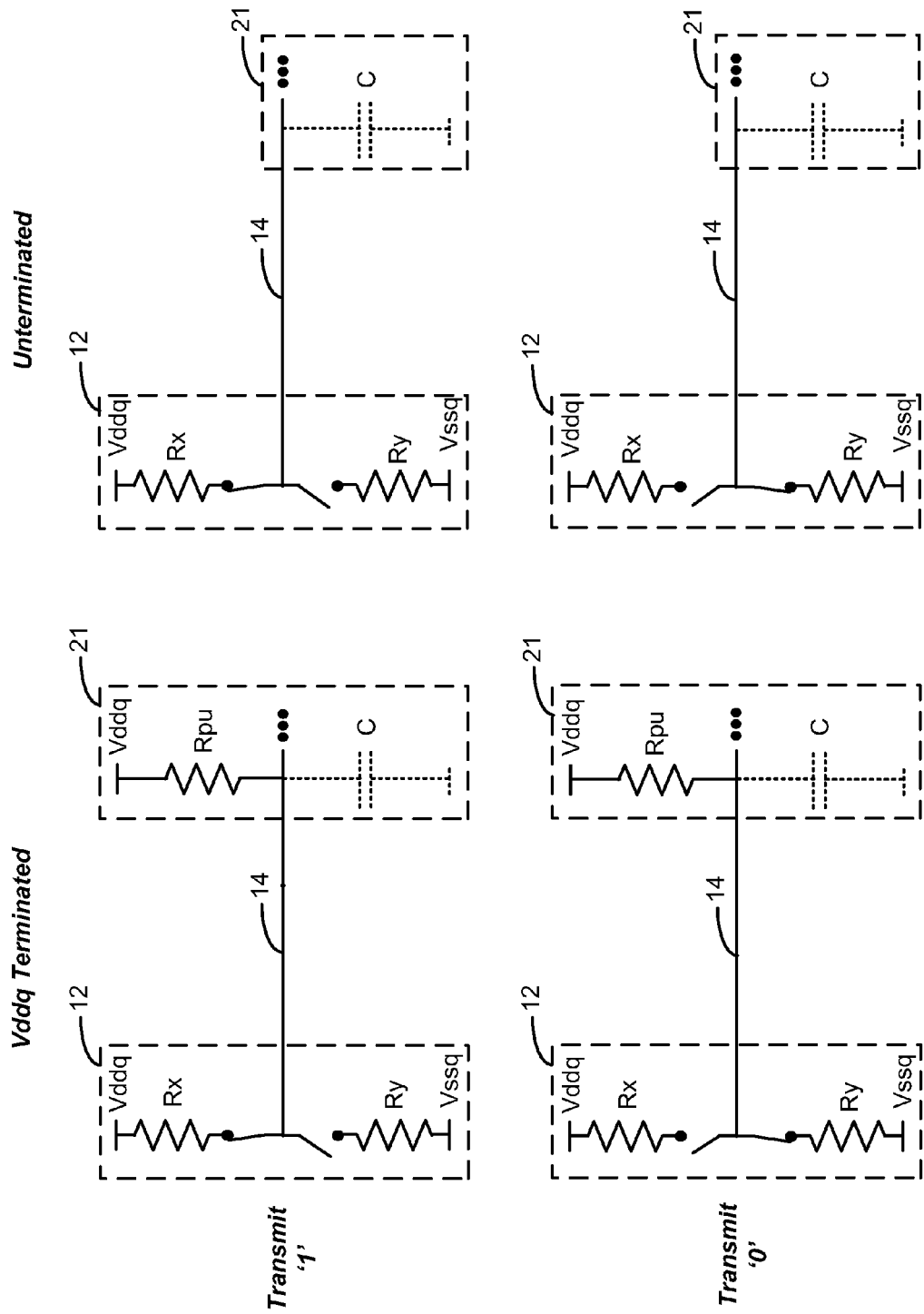
FIG. 2 illustrates further details concerning the data transmission circuitry and termination circuitry used in the data transmission system of FIG. 1.

When choosing a DBI algorithm for a particular system, it is important to consider the type of termination circuitry 21 used at the receiving device 9. As one skilled in the art will appreciate, the channels 14 can be terminated at the receiving device 9 in different ways, and two such ways are illustrated in FIG. 2. In this example, the transmitter 12 utilizes a Vddq-referenced signaling scheme, in which each of the transmitted logic states is referenced to Vddq. For simplicity, the transmitter 12 has been modeled as driving a logic '1' through resistor Rx (top row) and as driving a logic '0' through resistor Ry (bottom row).

The first column depicts termination circuitry 21 configured to terminate a channel 14 to the high power supply voltage, Vddq. Because Vddq-referenced signaling is used, such termination circuitry 21 comprises a pull up resistor, Rpu, to Vddq. In an actual implementation, Rpu can comprise a trimmable resistance of one or more transistors. In one implementation, Rpu may comprise 50 ohms or so, and would ideally be impedance-matched to the channel 14 to prevent reflections as is well known. One skilled in the art will understand that only the termination circuitry 21 is shown in the receiving device 9 in FIG. 2; the receivers 16 for resolving the transmitted logic state (e.g., the sense amps) are not shown for simplicity. In the second column, the channel 14 is unterminated, and hence lacks a termination resistor. In both the terminated and unterminated cases, a parasitic capacitance C is also shown, which capacitance can comprise the input capacitance of the receivers 16, the routing capacitance arising from the channels 14, etc. Of course, still different termination schemes other than those shown in FIG. 2 are possible. For example, the resistances of the termination (e.g., Rpu) can be modified, termination can be made to Vssq, or termination can be made to both Vddq and Vssq (e.g., using both pull-up and pull-down resistors).

There are advantages to different termination schemes. For example, an unterminated channel will generally draw less power, because only transient currents tending to charge and discharge the parasitic capacitance C will draw any power. However, an unterminated channel will be more reflective and will generally be noisier, which noise can affect the reliability of data resolution at the receivers 16. However, if a particular channel 14 is relatively short, or is carrying data at a relatively low rate, noise may be of less concern than power draw, and an unterminated channel might be desirable. By contrast, a terminated channel will be less noisy, but will draw more power through the termination resistance, at least when a particular data state is transmitted. Therefore, if relatively long channels are used, or if such channels carry data at relatively high rates, then a terminated channel might be desirable despite higher power consumption.

Realizing that different termination schemes can be desirable, depending on the particulars of the system in which a given device is placed, the art has recognized that a device's termination scheme can be made programmable to best fit the system at issue. See, e.g., U.S. Pat. Nos. 6,670,828; 6,362,644.

While different termination schemes can be beneficial in particular circumstances, the inventor has realized too that particular DBI algorithms are logical in conjunction with particular termination schemes, because particular DBI algorithms will tend to mitigate the shortcomings of the particular termination scheme chosen. For example, if unterminated channels are used, reflections arising from the transitions of different logic states are the concern, along with the power draw (albeit relatively small) that such transitions cause. As such, a minimum transitions DBI algorithm is a logical choice to use with an unterminated channel. If a channel is terminated to a particular power supply level, such as Vddq in FIG. 2, then a DBI algorithm that minimizes the frequency of transmission of the opposite power-drawing logic state—a minimum zeros algorithm—is a logical choice.

Figure 1:
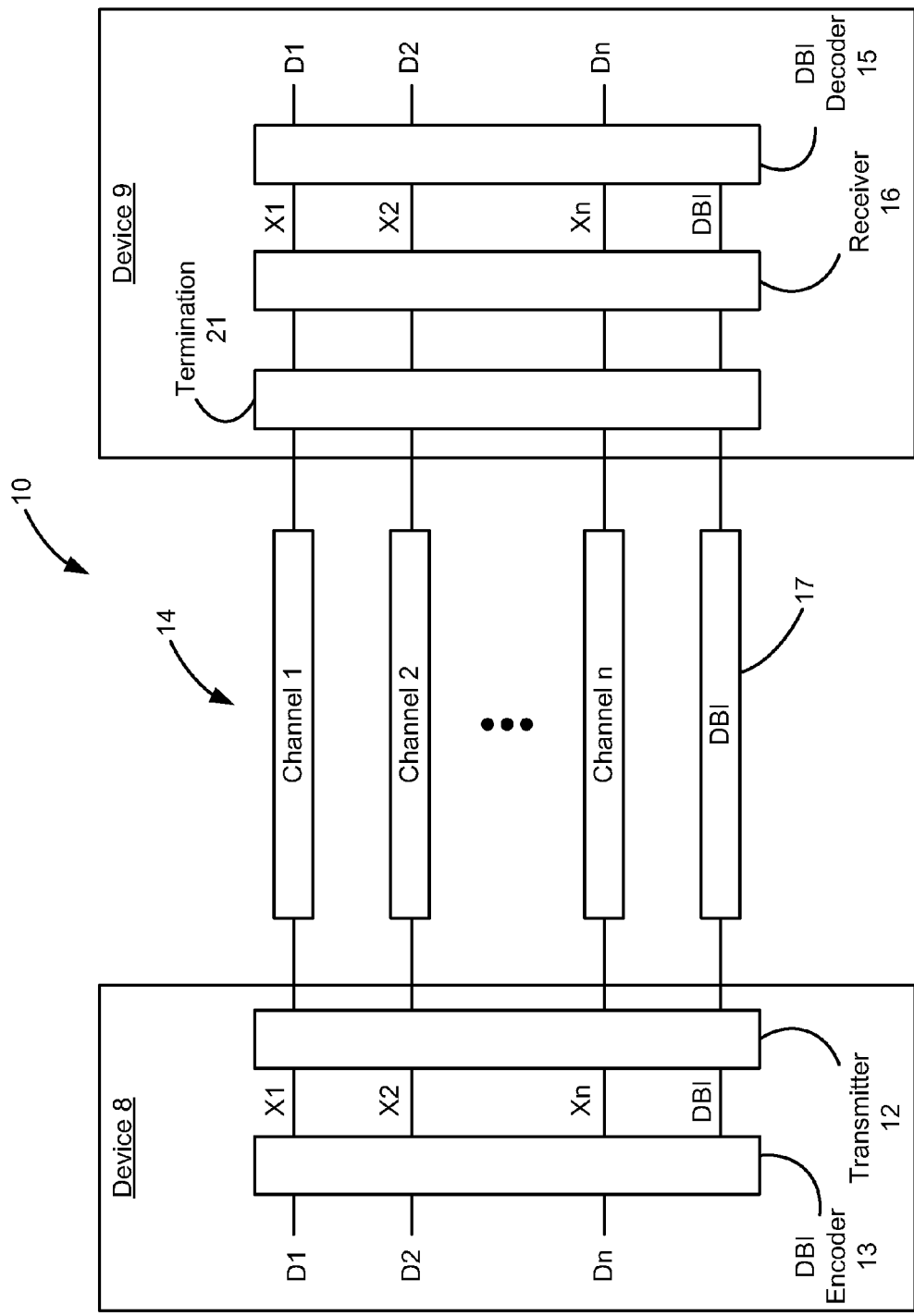
FIG. 1 illustrates a block diagram of a data transmission system in accordance with the prior art.
Figure 3:
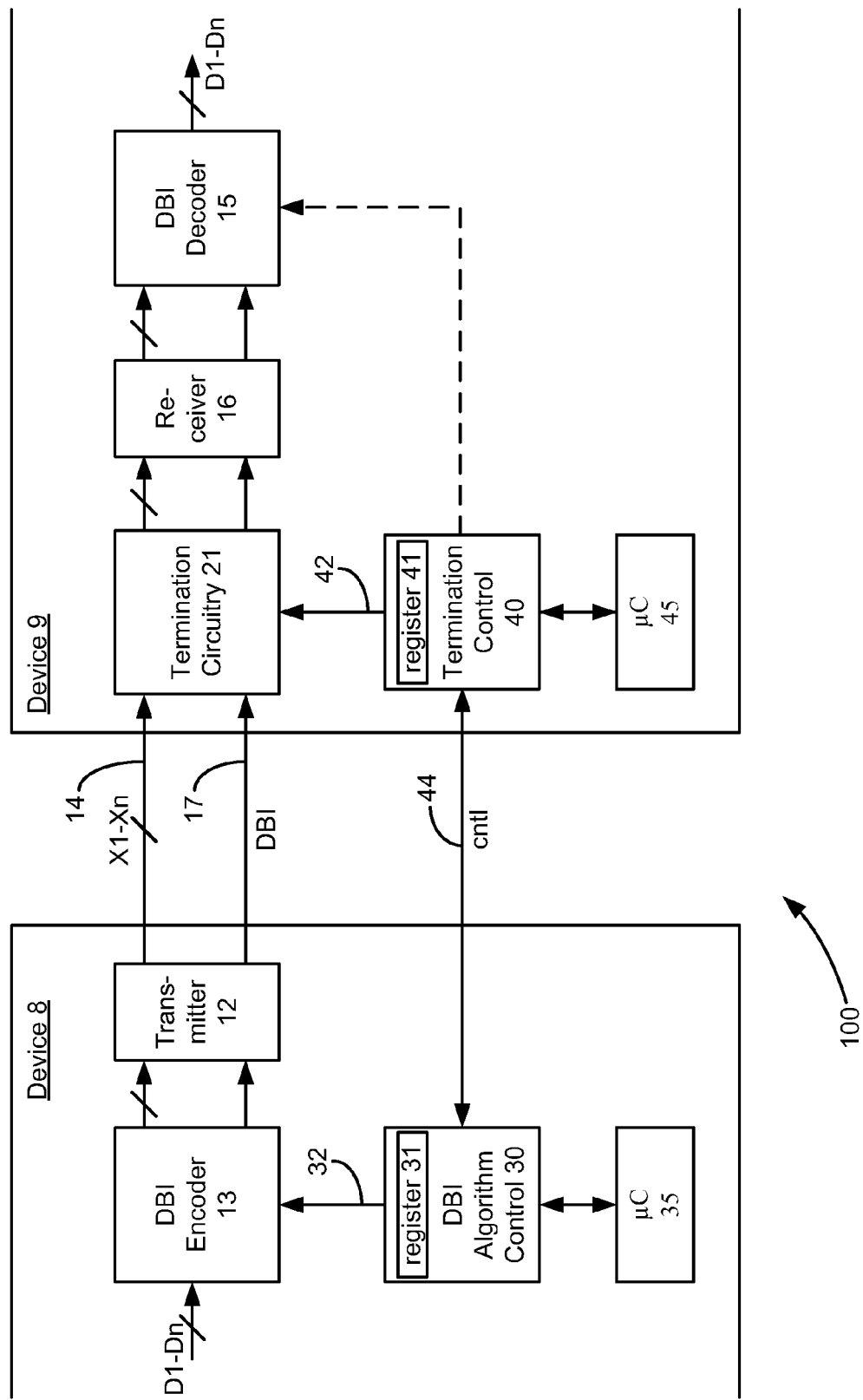
FIG. 3 illustrates an embodiment of an improved data transmission system in accordance with the invention, in which the DBI algorithms used to encode the data are optimally matched to the termination circuitry implemented in the receiving device by passing termination scheme information across a control channel.

Accordingly, embodiments of the invention allow tailoring the DBI algorithm in light of the termination scheme being used. FIG. 3 illustrates this in a first embodiment of an improved data transmission system 100 comprising a transmitting device 8 and a receiving device 9. Like FIG. 1, circuit blocks for the DBI encoder 13 and transmitter circuitry 12 can be seen in the transmitting device 8, and termination circuitry 21, receiver circuitry 16, and a DBI decoder 15 can be seen in the receiving device 9. However, and new to the disclosed embodiment, the transmitting device 8, including a DBI algorithm control circuit 30 for controlling the DBI encoder 13, and the receiving device 9 comprises a termination control circuit 40 for controlling the termination circuitry 21.

Termination control 40 configures the termination circuitry 21, i.e., sets the termination scheme to be used by receiving device 9. This may occur in conjunction with a microcontroller 45 in the receiving device 9, which microcontroller 45 can essentially be understood as all or part of the receiving device's core logic. The microcontroller 45 instructs termination control 40 to set the termination circuitry 21 accordingly. In this regard, the termination control 40 may contain a memory 41 for storing the termination scheme at issue, which memory may comprise a register for example. For example, to match the schemes depicted in FIG. 2, the register 41 may store a logic '0' denoting that an unterminated scheme is to be used, or store a '1' if termination to Vddq is to be used. Alternatively, more than two termination schemes could be used. For example, if register 41 is at least two bits long, '00' can represent no termination; '01' can represent termination to Vddq; '10' can represent termination to Vssq; and '11' can represent termination to Vddq and Vssq. In another example, '00' can represent no termination; '01' can represent termination to Vddq with a first resistance; '10' can represent termination to Vddq with a second resistance; and '11' can represent termination to Vddq with a third resistance, etc. Still other combinations of termination schemes are possible. In any event, one or more control signals 42 can then configure the termination circuitry 21 appropriately. For example, in our simple example, control signal(s) 42 can be used to include or discluded pull-up resistor Rpu (FIG. 2), depending on whether a terminated or unterminated scheme is chosen.

In FIG. 3, the termination scheme is made known to the transmitting device 8 by a control channel 44. Such control channel 44 may be dedicated to the function of informing the transmitting device 8 of the receiving device 9's termination scheme, but to save routing control, channel 44 would logically be shared with other functions. For example, because setting the termination scheme and DBI algorithms as discussed herein would logically take place during initialization of the system 100, control channel 44 can be used after initialization of the system to carry other control signals between devices 8 and 9. For example, after initialization and during useful operation of the system, control channel 44 could carry any traditional memory control signals (chip select, write enable, row-access strobe, column-access strobe, etc.), a clock signal, or any other signal generally used to control communications between devices 8 and 9.

Figure 4:
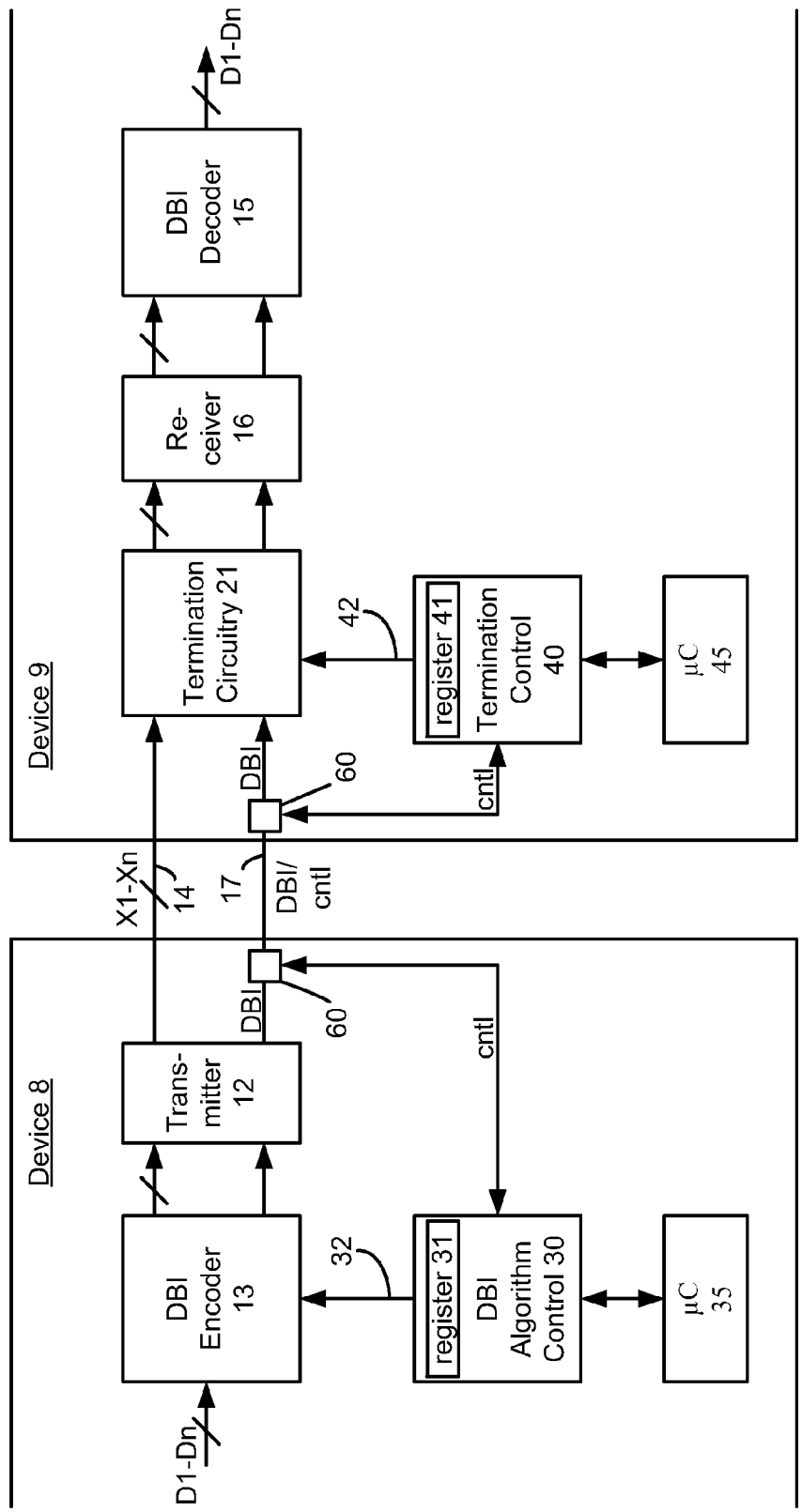
FIG. 4 illustrates a modification to the system of FIG. 3 in which the termination scheme information is passed across a DBI channel prior to useful operation of the system.

Alternatively, and as shown in FIG. 4, termination scheme communication from the receiving device 9 to the transmitting device 8 can occur along the same channel 17 that carries the DBI bits. This is once again possible because initialization of the termination/DBI schemes will logically take place before the system 100 is used during normal operation requiring the communication of DBI bits. Transmission gates 60 can be controlled (for example, by the microcontrollers 35 and 45) to couple the termination control 40 and DBI algorithm control 30 to channel 17 during initialization, but to then couple channel 17 to the transmitter circuitry 12 and termination circuitry 21 during normal operation to allow for transmission of the DBI bits.

Regardless of the means of communication, once the termination scheme information is received at the transmitting device 8, it is passed to DBI algorithm control 30, where it is used to choose a DBI algorithm and to configure the circuitry for the DBI encoder 13. Like termination control 40, the DBI algorithm control 30 may also include a memory (e.g., register) 31 for storing the received termination scheme information, which information may be stored in the same fashion it is stored in register 41 of the termination control 40. Once stored at DBI algorithm control 30, the DBI algorithm control 30 sends one or more control signals 32 to the DBI encoder 13 to configure its circuitry to perform the appropriate DBI encoding algorithm.

Figure 5A:
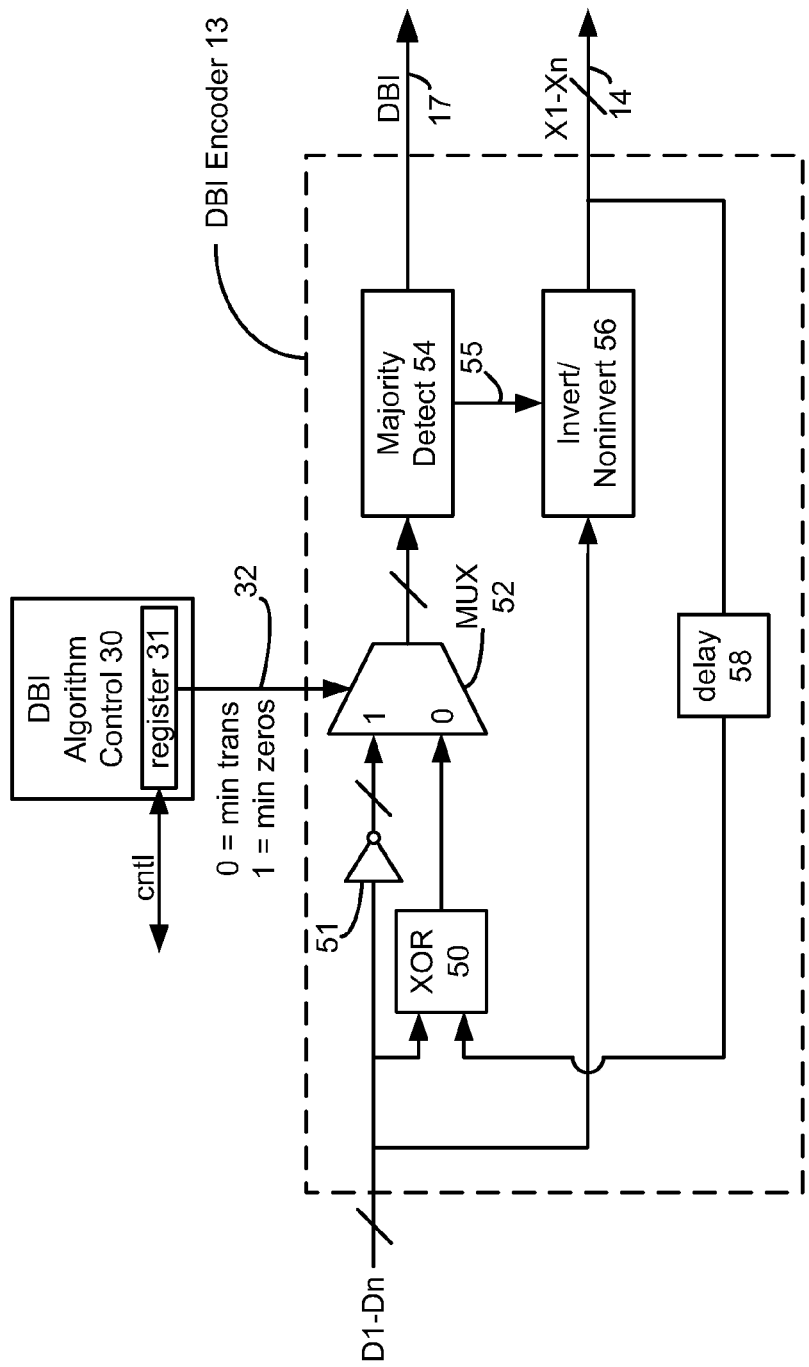
FIGS. 5A and 5B illustrate the details of a configurable DBI encoder which can be matched to the termination scheme in accordance with an embodiment of the invention.

FIG. 5A illustrates further details of DBI encoder 13 and the manner in which it may be configured in accordance with the termination scheme information received from the receiving device 9. Assuming, as earlier, that a '0' from termination control 40 represents no termination, the DBI algorithm control 30 will effect DBI encoder 13 via control signal(s) 32 to perform a minimum transitions algorithm. As shown in FIG. 5A, this control signal(s) 32 is used to control a multiplexer (mux) 52. If the minimum transitions algorithm is indicated ('0'), the mux 52 chooses the bottom input to the mux 52. This input comprises a comparison of the original data to be currently transmitted D1-Dn with the data as just transmitted by the channels 14 in the preceding cycle. Delay element 58 produces a one-cycle delay to affect the desired comparison between the current and preceding cycle. The comparison is affected by an exclusive OR (XOR) gate 50, which will provide a logic '1' for each bit that unless action is taken will change state. The results of the comparison are sent to majority detect circuit 54, which as its name implies determines whether a majority of logic '1' states are present—i.e., whether a majority of the bits are expected to change states. If so, the DBI bit is asserted on channel 17, control signal 55 goes high, and circuit block 56 inverts the original data D1-Dn to produce inverted data X1-Xn, which byte should have no more than half of its bits changing state compared to the preceding cycle. By contrast, if the majority detect circuit 54 determines that a majority of the bits are not expected to change state, the DBI bit is not asserted, control signal 55 is not asserted, and the original data D1-Dn passes through circuit block 56 without inversion as signals X1-Xn.

Assuming as earlier that a '1' from termination control 40 represents termination to Vddq, the DBI algorithm control 30 will configure DBI encoder 13 via control signal(s) 32 to perform a minimum zeros algorithm. In this instance, the mux 52 chooses its top input, thereby passing an inverted version of the original data D1-Dn via inverter 51 to the majority detect circuit 54. (As a side note, when implementing a minimum ones DBI algorithm, the inverter 51 would be eliminated from the circuitry). The majority detect circuit 54 then determines whether the inverted data comprises a majority of '1's, i.e., whether the original data D1-Dn comprises a majority of '0's. If so, the DBI bit is asserted, control signal 55 goes high, and circuit block 56 inverts the original data D1-Dn to produce inverted data X1-Xn, which byte should have no more than half of its bits at a logic '0' state. By contrast, if the majority detect circuit 54 determines that inverted data does not have a majority of '1's, i.e., that the original data D1-Dn does not have a majority of '0's, the DBI bit is not asserted, control signal 55 is not asserted, and the original data passes through circuit block 56 without inversion as signals X1-Xn.

Figure 5B:
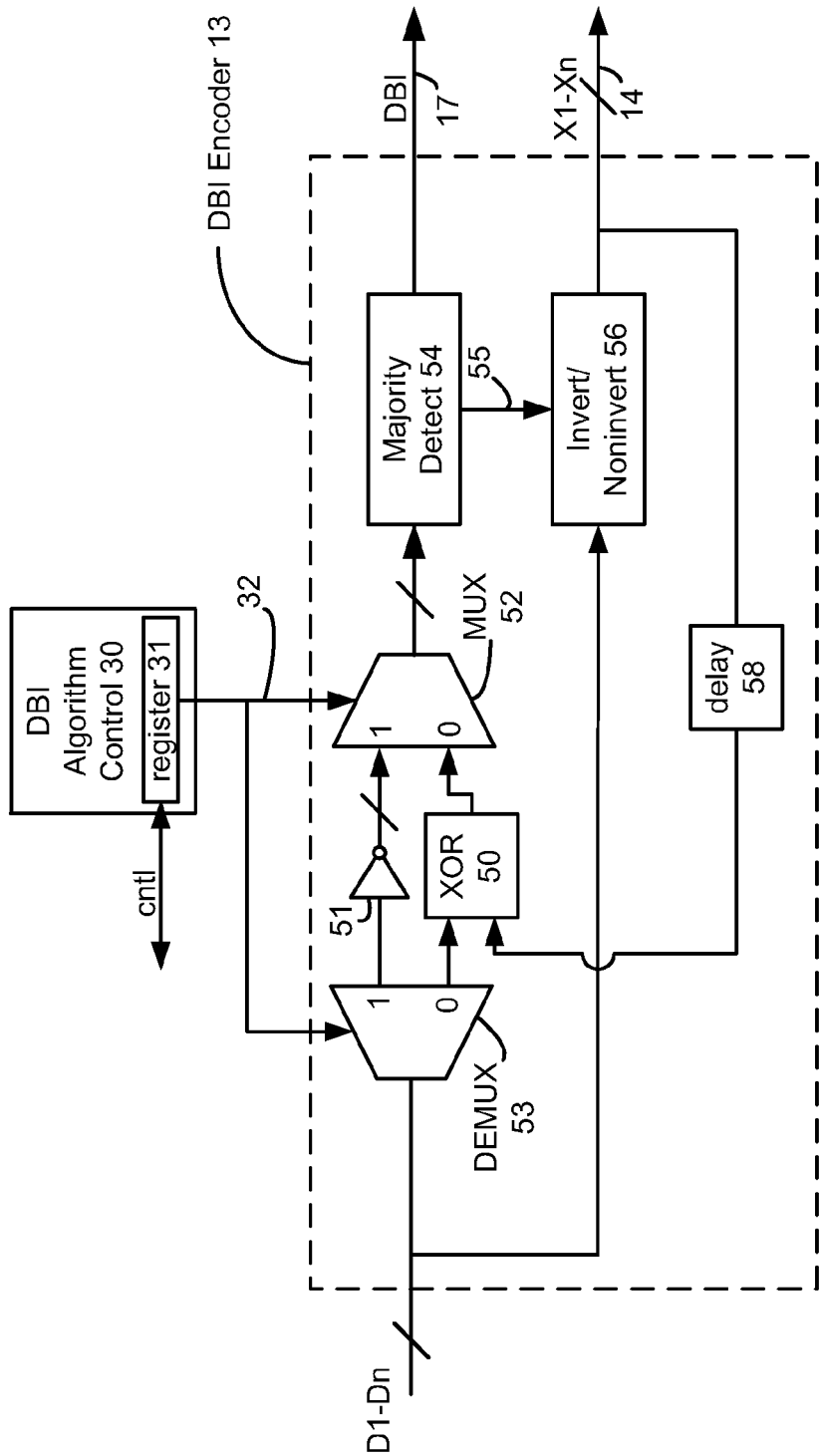

An implementation for a configurable DBI encoder 13 that draws less power is shown in FIG. 5B. Added is a demultiplexer (DEMUX) 53, which like MUX 52 is controlled by the same control signals 32. DEMUX 53 isolates inverter 51 and XOR gate 50 from the original data signal D1-Dn. As a result, inverter 51 will only operate on the original data when that path is selected by DEMUX 53 (i.e., when control signal 32 equals '0'), and the comparison of XOR gate 50 is only performed when that path is selected by DEMUX 53 (i.e., when control signal 32 equals '1'). Otherwise, when these paths are not selected, they remain dormant, implying zero power draw in a CMOS design. Although control signal 32 for MUX 52 is illustrated as being used by DEMUX 53, it should be understood that DBI algorithm control 30 could issue unique control signal(s) to the DEMUX 53.

The disclosed system 100 is thus able to detect the termination scheme being used at the receiving device 9, and is able to communicate that information to the transmitting device 8, which transmitting device 8 in turn chooses an appropriate DBI algorithm for the termination scheme, thereby reducing shortcoming of the termination scheme chosen. In so doing, the device 8 is more flexible and can adjust data encoding in a manner that is optimal for the termination scheme being used by device 9. This allows the manufacture of device 8 to provide a DBI encoder 13 capable of performing any number of different DBI algorithms that may be optimal for the device 9 with which it is integrated.

Device 8 is also able to adapt to any changes in the termination scheme used at device 9, which termination scheme can change on the fly, i.e., during the operation and after initialization of the system 100. For example, as the demand for low power operation increases, it is not uncommon for system 100 to operate at multiple frequencies. Such dynamic behaviour is sometimes referred to as Dynamic Voltage Frequency Scaling (DVFS). Consider for example a nominally Vddq-terminated interface which is supplemented with minimum zeros DBI encoding, as discussed. If during a low power mode the data rate is lowered sufficiently, termination may no longer be necessary at receiving device 9, in which case such termination is temporarily removed. When such a change in the termination scheme has occurred and has been communicated to the transmitting device 8, the DBI algorithm implemented can be changed from a minimum zeros to a minimum transitions algorithm, with the benefits noted earlier. In this case, the on-the-fly change in the termination scheme information can be transmitted by either of channels 44 or 17 as discussed earlier, but in a time-multiplexed manner not otherwise impeding the information otherwise flowing on those channels during operation.

It may not always be necessary for termination scheme information to be communicated from the receiving device 9 to the transmitting device 8 for the disclosed technique to work. For example, consider again the just-disclosed example of a system operating pursuant to DVFS. In such a system, the transmitting device 8 may know in advanced how the receiving device 9 will react to changes in the rate of the data it is transmitting, and can therefore change the DBI algorithm automatically once certain data rates are achieved, knowing that the receiving device 9 will in turn be changing the termination schemes accordingly. While the registers 31 and 41 could still continue to be updated in this embodiment, communication of the termination scheme information between the transmitting and receiving devices 8 and 9 is unnecessary, but matching is still had between the termination scheme and the DBI algorithm.

Figure 6:
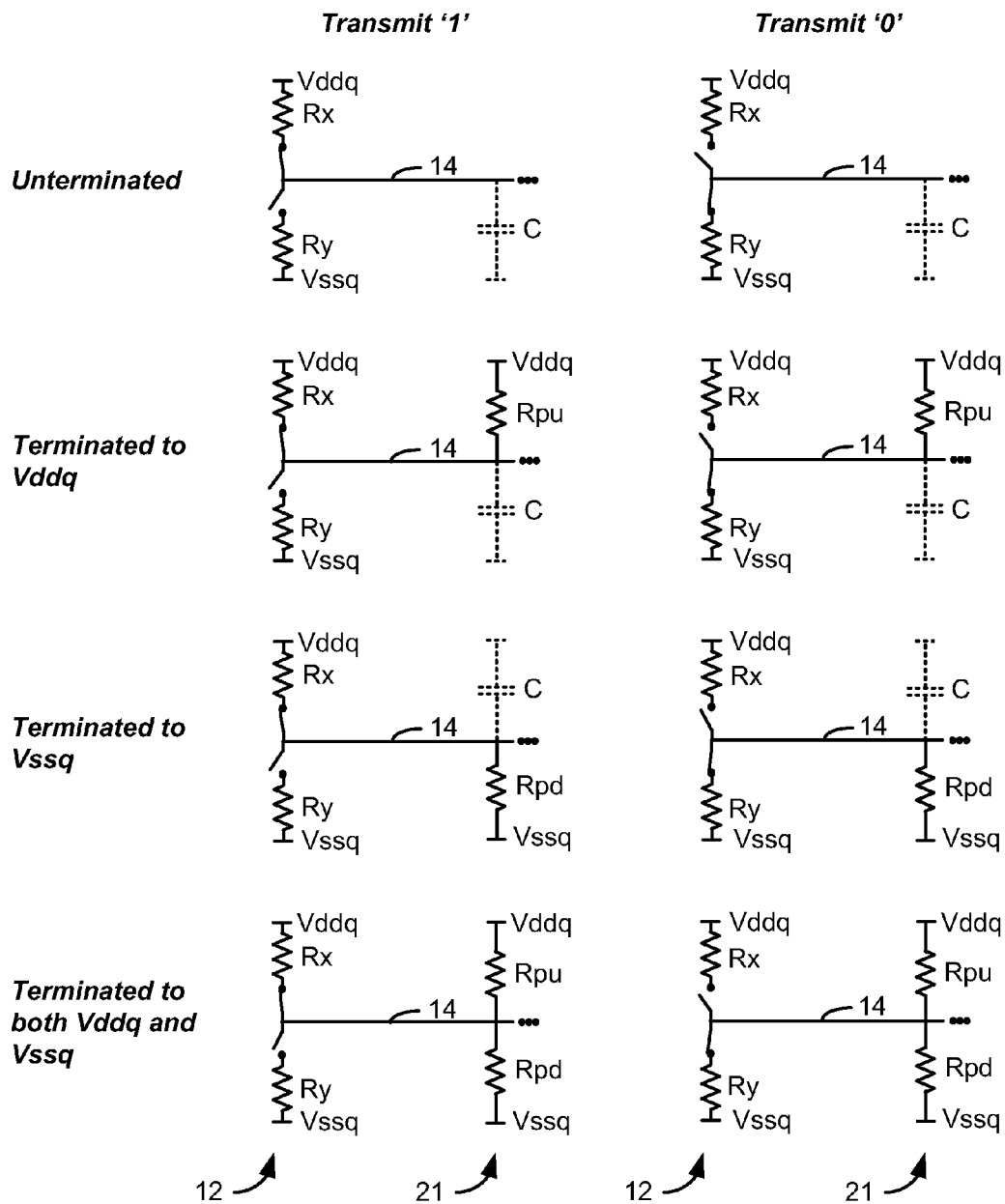
FIG. 6 illustrates how the termination scheme used in the receiving device can be measured by the transmitting device to allow the termination device to set the DBI algorithm accordingly.

In an alternative embodiment, the transmitting device 8 can perform measurements to determine the termination scheme being used in the receiving device 9, which provides yet another example in which the termination scheme information need not be specifically communicated from the receiving device 9 to the transmitting device 8 to allow the latter to set the DBI algorithm appropriately. An example of this embodiment is shown in FIG. 6, which like FIG. 2 shows a transmitter 12 in the transmitting device 8, termination circuitry 21 in the receiving device 9, and a channel 14 connecting them. As noted earlier, the transmitter 12 can be modelled as a pull-up resistance Rx and a pull-down resistance Ry. Likewise, the termination circuitry 21 can be modelled as a pull-up resistance Rpu (Vddq termination) and a pull-down resistance Rpd (Vssq termination). Four different termination schemes are shown in each of the rows in FIG. 6, with the two columns representing the transmission of logic '0' or '1' states into those termination circuits.

Each of the eight circuitry configurations in FIG. 6 produces a particular steady state (DC) voltage on the channel 14, which value depends on the various resistor values. Assume for simplicity that each of the depicted resistances are the same, i.e., Rx=Ry=Rpu=Rpd, and assume further that Vssq equals 0. If these assumption are made, and recognizing the various voltage dividers and other configurations that are formed, the below Table lists the steady state channel voltages arising from the eight circuitry configurations shown in FIG. 6:

TABLE 1

| Voltage on Channel | Transmit '1' | Transmit '0' |
|---|---|---|
| Unterminated | Vddq | 0 |
| Terminated to Vddq | Vddq | 0.5 * Vddq |
| Terminated to Vssq | 0.5 * Vddq | 0 |
| Terminated to both Vddq and Vssq | 0.75 * Vddq | 0.25 * Vddq |

These voltage values, when measured at the transmitting device 8, thus inform the transmitting device 8 about the termination scheme used in the receiving device 9, so that the transmitting device can set the DBI algorithm accordingly. Such measurements would be performed by sensing circuitry, and could possibly use the receivers in the transmitting device 8 if the communication channels 14 are bi-directional. As sensing circuitry capable of sensing particular voltage levels is well known, the same is not shown in FIG. 6 for simplicity. In any event, such measurements are logically taken during initialization of the system, although this is not strictly necessary. Because steady states values are being measured, such measurements may involve biasing the transmitter 12 for a longer time than would generally be used to transmit data during normal operation.

Exactly which measurements are taken by the transmitting device 8 to infer the termination scheme being used in the receiving device 9 requires the transmitting device 8 to understand the possible termination schemes to some degree. For example, if all four termination schemes depicted in FIG. 6 are possible in receiving device 9, then measuring using a single transmitted data state (either a '1' or '0') would not be sufficient because, as Table 1 shows, duplicate steady states values can result (at least for the resistance values assumed). Therefore, measurements at both transmitted logic states would be necessary. By contrast, assume that only the unterminated, terminated to Vddq and terminated to both Vddq and Vssq schemes are used. In this case, and according to Table 1, measurement of the termination scheme can be had by transmission of a logic '0' state alone, because each scheme produces different voltage values (0, 0.5*Vddq, and 0.25*Vddq respectively); transmission of a logic '1' state produces duplicate values (Vddq, Vddq, and 0.75*Vddq) and hence is insufficient by itself to infer the termination scheme. In any event, once the termination scheme has been inferred through suitable measurements, the DBI algorithm can be set in any of the manners disclosed herein.

It should be understood that a particular DBI algorithm corresponding to a particular termination scheme can itself be comprised of more than one DBI algorithm, a combination of DBI algorithms, or a DBI algorithm which varies over time. For example, in U.S. Pat. No. 7,616,133, a DBI algorithm is disclosed which combines the characteristics of minimum zeros and minimum transitions algorithms by applying one of the two algorithms to a certain number of cycles (e.g., bytes) in a data transmission, with remaining cycles (bytes) in the transmission being encoded with the other algorithm.

Figure 7:
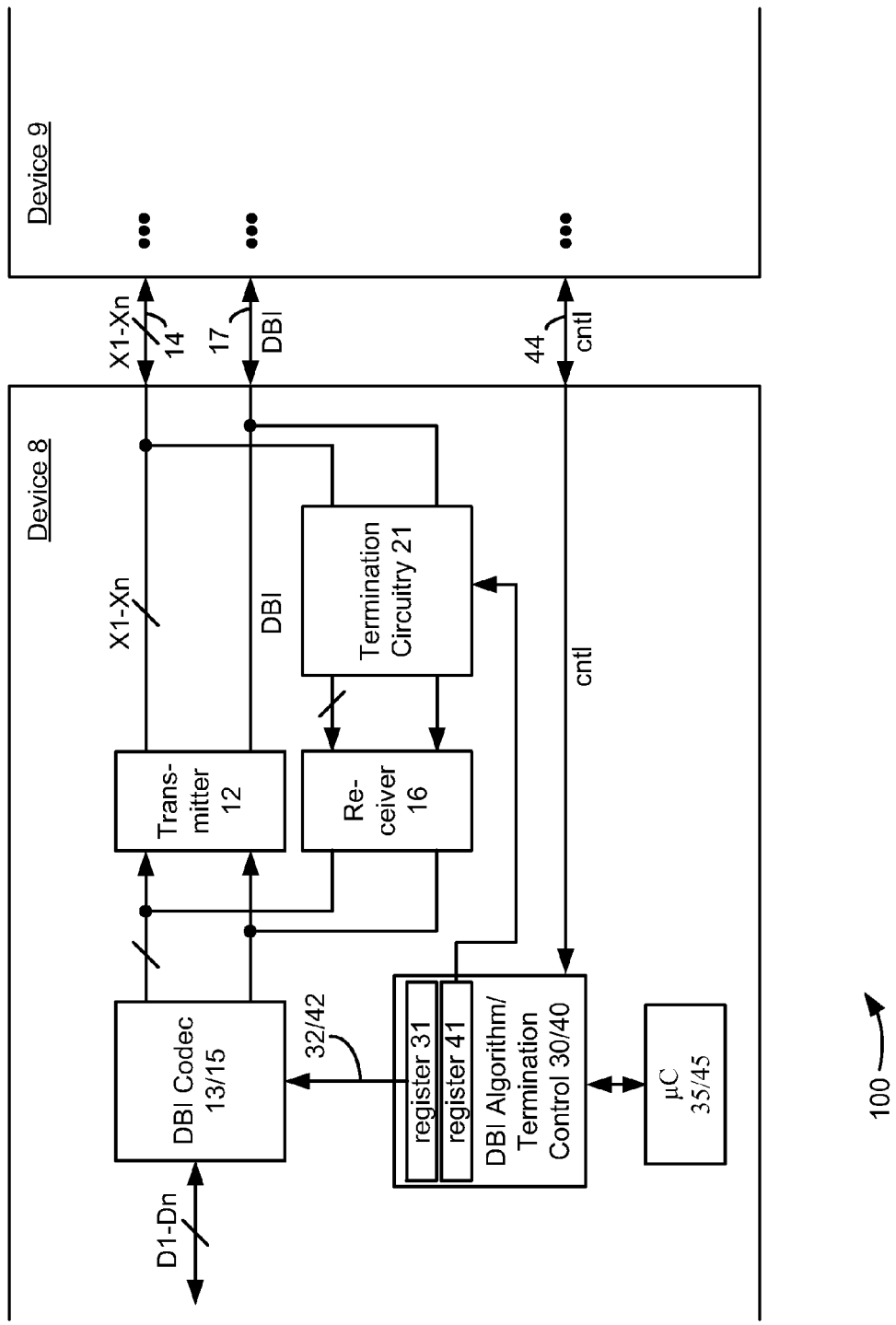
FIG. 7 illustrates an implementation of the invention in a bi-directional data transmission system.

To this point, embodiments of the technique has been described for simplicity assuming that communication only occurs in one direction between the two devices 8 and 9: that one device in the system 100 (device 8) transmits data which is received at the other device (device 9). However, in a realistic system, communication channels 14 are often bidirectional, with both of devices 8 or 9 receiving and transmitting data at different times. Accordingly, in such a system, the disclosed circuitry would be repeated at both of the devices 8 and 9, and this is shown in FIG. 7. The transmitters 12, receivers 16, and termination circuitry 21 are structured as normal in a bi-directional device, as is the DBI codec (encoder-decoder) 13/15. In the example shown in FIG. 7, DBI algorithm control and termination control have been combined in a single circuit block 30/40, although this is not strictly necessary. However, registers 31 and 41 are shown separately. As explained earlier, register 31 sets the DBI encoding algorithm to be used when device 8 is transmitting data, and therefore stores information regarding the termination scheme used in the other device 9. As explained earlier, this termination scheme information originates in register 41 in the other device 9, which information is received at register 31 in device 8 via a suitable control channel, such as control channel 44 as shown in FIG. 7 or the DBI channel 17. Register 41 in reciprocal fashion stores the termination scheme for device 8, and sets the termination circuitry 21 in device 8, and will likewise transmit that information to register 31 in the other device 9 so that it may set its DBI encoding algorithm accordingly. Note that through this arrangement it is possible for devices 8 and 9 to implement different DBI encoding algorithms. For example, if device 8 is unterminated, but device 9 is terminated to Vddq, device 8 can configure its DBI codec 13 to encode data for transmission using a minimum zeros algorithm appropriate for device 9's termination scheme, while device 9 can configure its DBI codec to encode data for transmission using a minimum transitions algorithm appropriate for device 8's termination scheme.

To this point, it has been assumed that while DBI encoding in a first device (device 8) will be reconfigured (as in FIG. 5A) depending on a second device's (device 9's) termination scheme, DBI decoding remains the same in the second device. This is sensible because while DBI encoding differs between typical DBI algorithms, decoding—typically XOR-ing the received data with its corresponding DBI bit as mentioned earlier—would generally be the same between typical DBI algorithms. However, this is not universally true; if other encoding algorithms or more complex DBI algorithms are used, decoding in the second device may also need to be reconfigured in tandem with encoding in the first device, and an alternative embodiment allowing the disclosed technique to be extended to achieve this result is shown in FIG. 3 in dotted lines. As shown, DBI decoder 15 in the second device, like DBI encoder 13 in the first device, receives termination scheme information from the second device. Knowing how the DBI encoder 13 will reconfigure itself, the DBI decoder 15 can likewise reconfigure its circuitry to a decoding configuration matching the DBI algorithm used at the DBI encoder 13.

Figure 8:
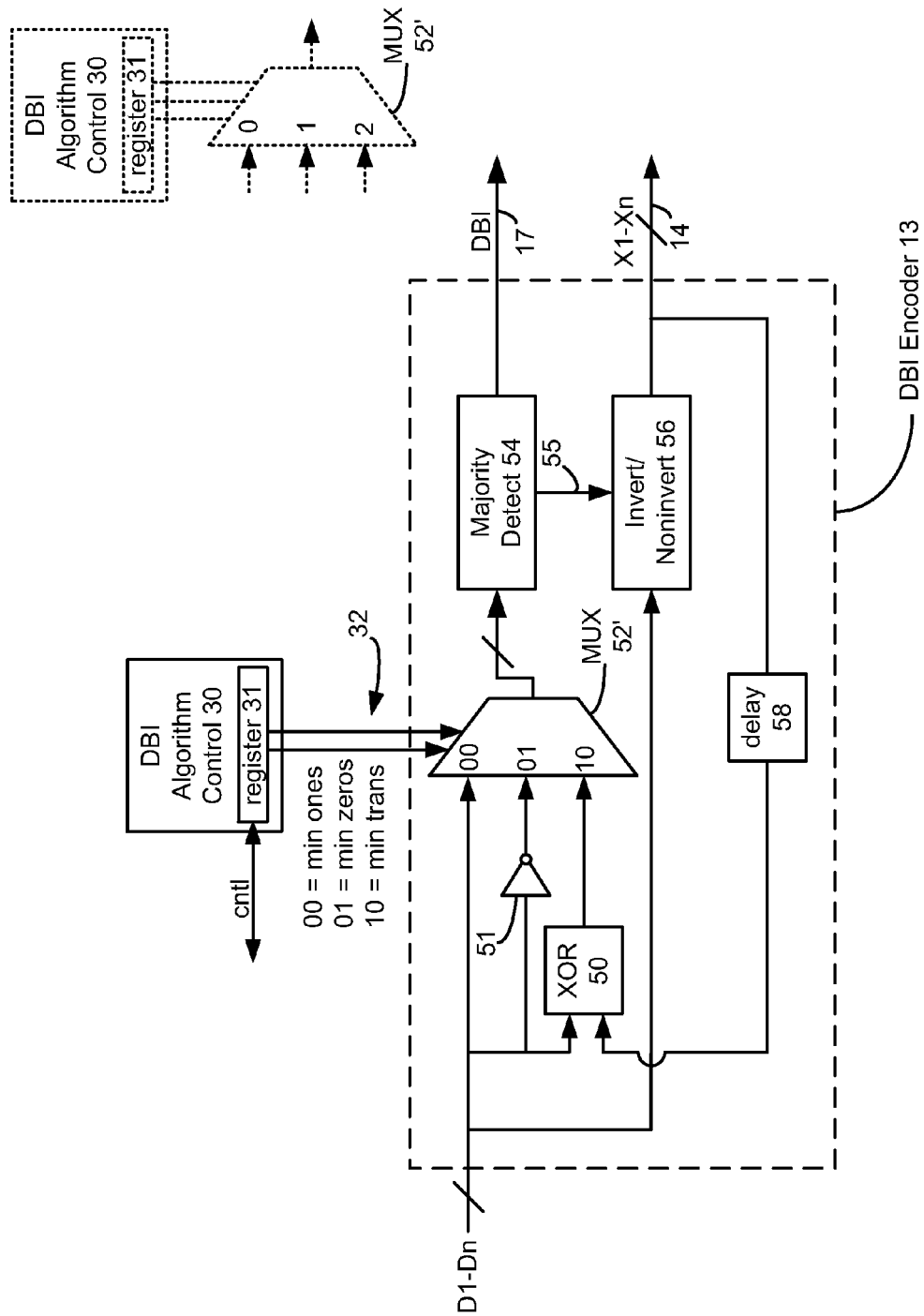
FIG. 8 illustrates the details of another configurable DBI encoder which can match three DBI algorithms to three termination schemes in accordance with an embodiment of the invention.

In the disclosed embodiments, the DBI encoder 13 is shown as configurable in accordance with two DBI algorithms, implying that such circuitry can only be responsive to two different types of termination schemes in the other device. However, the disclosed technique is not so limited, and can be used in systems 100 where two or more DBI algorithms/terminations schemes are utilized. For example, if the termination circuitry 21 is able to be configured as unterminated, Vddq terminated, and Vssq terminated, then DBI encoding circuitry 13 can easily be modified to implement minimum transition, minimum zeros, and minimum ones DBI algorithms respectively, as shown in FIG. 8. As shown, original data D1-Dn is fed into a three-input mux 52', with input '00' enabling minimum ones, '01' enabling minimum zeros, and '10' enabling minimum transitions. (Input '11' is unused in this example, but could support selection of a fourth DBI algorithm). Such inputs can be chosen on the basis of two control signals 32. Alternatively, three discrete control signals can be used to choose the three inputs as shown at the right in dotted lines in FIG. 8. Either way, DBI encoder 13 works much as described earlier with respect to FIG. 5A, the significant difference being input '00' allowing for the detection of a majority of ones at majority detect 54, and if such a majority is detected then inverting the data at circuit block 56 accordingly to produce a majority of zeros at outputs X1-Xn, i.e., a minimum of ones. Although not shown in FIG. 8, it should be understood that the use of an additional DEMUX 53 can be used to prevent needless power draw, as was illustrated and discussed with respect to FIG. 5B.

To this point, it has been assumed that the disclosed technique seeks to configure the DBI algorithm to match the termination scheme being used. However, the technique is easily modified in reciprocal fashion to also configure the termination scheme to match the DBI algorithm. Returning to FIG. 3 for example, this modification of the disclosed technique may involve programming the termination circuitry 21 in the receiving device 9 to match the DBI algorithm preselected in the transmitting device 8. This would work as follows: The DBI encoder 13 in transmitting device 8, once set per register 31, would send DBI algorithm information via control channel 44 for example to the termination control 40 in receiving device 9. Device 9, upon learning the DBI algorithm being used, would then store such information in its register 41, and configure the termination circuitry 21 appropriately via control signal 42 to best match to the DBI algorithm being used. In effect, in this implementation, the transmitting device programs the termination circuitry of the receiving device as in the prior art (see, e.g., U.S. Pat. Nos. 6,670,828; 6,362,644 noted above), but does so to match termination to the particular data encoding algorithm being used. This implementation achieves the same result of optimally matching DBI algorithms to particular termination schemes, and thus achieves the same benefits discussed earlier.

Finally, while the disclosed technique has focused on the use of DBI encoding and decoding to match the termination scheme being utilized, it should be realized that the technique is not limited to this form of encoding and decoding. Other forms of encoding and decoding which would also benefit from matching to particular termination schemes can also be used. For example, as an alternative to the DC coupled resistive termination schemes focused on throughout this application, interconnects which rely on AC coupling benefit from DC balanced encoding algorithms and/or forced transition algorithms as well, such as the well known Manchester encoding algorithm.

As noted earlier, DBI and other encoding algorithms need not require a dedicated channel for parallel transmission of the encoding indicator (e.g., DBI bit), and instead can send a byte of such encoding indicators before or after the transfer of associated data. The disclosed technique is easily modified to work with this alternative DBI/encoding scheme, and would merely require minor topological changes, for example, registers to store the accumulated DBI bits and on-chip routing to present the DBI bits from the registers at appropriate output drivers and at appropriate times relative the transmission of the data.

Although disclosed embodiments have assumed that data is transmitted from the transmitting device 8 to the receiving device 9 via a plurality of data channels 14, it should be understood that use of a plurality of data channels is not strictly necessary. For example, encoded data can be sent along a single data channel 14 in series, instead of in parallel across a plurality of data channels 14.

Disclosed embodiments seek to match particular DBI/encoding algorithms with termination schemes. However, it should be recognized that a suitable DBI or encoding algorithm for a particular termination scheme can simply comprise no DBI or encoding at all, meaning that the DBI encoder 13 is simply bypassed for the particular termination scheme in question. For example, it may be desirable to select a minimum zeros DBI algorithm if the data channels 14 are terminated to Vddq, but to select no DBI encoding at all if the data channels 14 are unterminated. It should be understood therefore that just as an unterminated channel can comprise a "termination scheme," failure to encode can also comprise an "encoding algorithm" as used in the claims.

While some implementations have been disclosed, it should be understood that the disclosed circuitry can be achieved in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. A method for setting an encoding algorithm in a data transmission system comprising a first device and a second device coupled by at least one data channel, the method comprising:
    automatically determining at the first device a termination scheme used for the at least one data channel in the second device such that the termination scheme used in the second device is known by the first device;
    automatically selecting an encoding algorithm in the first device in response to the determined termination scheme used in the second device; and
    transmitting data from the first device to the second device along the at least one data channel, wherein the transmitted data is encoded using the selected encoding algorithm selected by the first device in response to the determined termination scheme used in the second device.

2. The method of claim 1, wherein the encoding algorithm comprises a data bus inversion algorithm.

3. The method of claim 1, wherein the termination scheme is selected from the group consisting of unterminated, terminated to a high voltage, and terminated to a low voltage.

4. The method of claim 1, wherein the encoding algorithm is selected from the group consisting of a minimum transitions algorithm, a minimum ones algorithm, a minimum zeros algorithm, and a no encoding algorithm.

5. The method of claim 1, wherein the termination scheme comprises an unterminated termination scheme, and wherein the selected encoding algorithm minimizes transitions in logic states of the transmitted data.

6. The method of claim 1, wherein the termination scheme comprises termination to a first voltage, and wherein the selected encoding algorithm minimizes a logic state of the transmitted data opposite the first voltage.

7. The method of claim 1, a method for setting an encoding algorithm in a data transmission system comprising a first device and a second device coupled by at least one data channel, the method comprising: automatically determining at the first device a termination scheme used for the at least one data channel in the second device; automatically selecting an encoding algorithm in the first device in response to the determined termination scheme; and transmitting data from the first device to the second device along the at least one data channel, wherein the transmitted data is encoded using the selected encoding algorithm wherein the termination scheme is determined by transmitting termination scheme information from the second device to the first device.

8. The method of claim 7, wherein the transmission of the termination scheme information occurs along a control channel between the first and second devices.

9. The method of claim 1, a method for setting an encoding algorithm in a data transmission system comprising a first device and a second device coupled by at least one data channel, the method comprising: automatically determining at the first device a termination scheme used for the at least one data channel in the second device; automatically selecting an encoding algorithm in the first device in response to the determined termination scheme; and transmitting data from the first device to the second device along the at least one data channel, wherein the transmitted data is encoded using the selected encoding algorithm wherein the termination scheme is determined by the first device by taking at least one measurement of a voltage on the at least one data channel.

10. The method of claim 1, wherein the termination scheme is determined in accordance with at least one condition of the transmitted data.

11. The method of claim 10, wherein the at least one condition comprises a rate of the transmitted data.

12. The method of claim 1, wherein the determined termination scheme is stored in a memory in the first device.

13. The method of claim 12, wherein the memory provides the stored termination scheme to an encoder in the first device, and wherein the encoder is configured to select the encoding algorithm in accordance with the stored termination scheme.

14. A data transmission system, comprising:
    a first device and a second device coupled by at least one data channel,
    the second device comprising termination circuitry for the at least one channel, wherein the termination circuitry is configurable to implement a plurality of termination schemes,
    the first device comprising an encoder for encoding original data to be transmitted to the second device on the at least one data channel, wherein the encoder is configurable to implement one of a plurality of encoding algorithms to encode original data depending on the termination scheme implemented at the second device and known by the first device.

15. The system of claim 14, wherein the plurality of encoding algorithms comprise data bus inversion algorithms.

16. The system of claim 14, wherein the plurality of termination schemes are selected from the group consisting of unterminated, terminated to a high voltage, and terminated to a low voltage.

17. The system of claim 14, wherein the plurality of encoding algorithms are selected from the group consisting of a minimum transitions algorithm, a minimum ones algorithm, a minimum zeros algorithm, and a no encoding algorithm.

18. The system of claim 14, wherein the encoder implements an encoding algorithm which minimizes transitions in the encoded original data when an unterminated scheme is implemented at the second device.

19. The system of claim 14, wherein the encoder implements an encoding algorithm which minimizes a logic state in the encoded original data when the termination scheme implemented at the second device comprises termination to a voltage opposite the logic state.

20. The system of claim 14, further comprising a first and a second device coupled by at least one data channel, the second device comprising termination circuitry for the at least one channel, wherein the termination circuitry is configurable to implement a plurality of termination schemes, the first device comprising an encoder for encoding original data to be transmitted to the second device on the at least one data channel, wherein the encoder is configurable to implement one of a plurality of encoding algorithms depending on the termination scheme implemented at the second device; and a control channel between the first and second devices configured for carrying information concerning the termination scheme implemented at the second device to the encoder.

21. The system of claim 14, further comprising a first and a second device coupled by at least one data channel, the second device comprising termination circuitry for the at least one channel, wherein the termination circuitry is configurable to implement a plurality of termination schemes, the first device comprising an encoder for encoding original data to be transmitted to the second device on the at least one data channel, wherein the encoder is configurable to implement one of a plurality of encoding algorithms depending on the termination scheme implemented at the second device; and sensing circuitry at the first device for measuring the at least one data channel to determine the termination scheme implemented at the second device.

22. The system of claim 14, further comprising a first and a second device coupled by at least one data channel, the second device comprising termination circuitry for the at least one channel, wherein the termination circuitry is configurable to implement a plurality of termination schemes, the first device comprising an encoder for encoding original data to be transmitted to the second device on the at least one data channel, wherein the encoder is configurable to implement one of a plurality of encoding algorithms depending on the termination scheme implemented at the second device; and an encoding indicator channel between the first and second devices configured for carrying an encoding indicator transmitted from the encoder in the first device to a decoder in the second device, wherein the encoding indicator channel is further configured for carrying information concerning the termination scheme implemented at the second device to the encoder in the first device.

23. The system of claim 14, wherein the first device further comprises a first controller for the encoder, a first and a second device coupled by at least one data channel, the second device comprising termination circuitry for the at least one channel, wherein the termination circuitry is configurable to implement a plurality of termination schemes, the first device comprising an encoder for encoding original data to be transmitted to the second device on the at least one data channel, wherein the encoder is configurable to implement one of a plurality of encoding algorithms depending on the termination scheme implemented at the second device wherein the first controller stores information concerning the termination scheme implemented at the second device.

24. The system of claim 23, wherein the second device further comprises a second controller for the termination circuitry, wherein the second controller stores information concerning the termination scheme implemented at the second device.

25. A first device, comprising:
an encoder configured to encode original data to be transmitted to a second device on at least one data channel, wherein the encoder is configurable to implement one of a plurality of encoding algorithms to encode original data to be transmitted to the second device; and
a memory configured to receive information concerning a termination scheme implemented at the second device, wherein the termination scheme information implemented at the second device is used to configure the encoder to implement a particular one of the encoding algorithms to encode original data to be transmitted to the second device based on the termination scheme information implemented at the second device.

26. A second device, comprising:
termination circuitry configured to receive encoded data from a first device on at least one data channel, wherein the termination circuitry is configurable to implement one of a plurality of termination schemes; and
a memory configured to receive information concerning an encoding algorithm implemented in the first device, wherein the encoding algorithm of the second device information is used to configure the termination circuitry to implement a particular one of the termination schemes based on the encoding algorithm information implemented in the first device.

27. The device of claim 26, further comprising a decoder for decoding the encoded data from a first device.

28. A method for setting a termination scheme in a data transmission system comprising a first device and a second device coupled by at least one data channel, the method comprising:
automatically determining at the second device an encoding algorithm used by the first device;
automatically selecting a termination scheme in the second device for the at least one data channel in response to the determined encoding algorithm used by the first device; and
receiving data at the second device from the first device along the at least one data channel, wherein the data received at the second device is encoded at the first device using the encoded algorithm known by the second device.

29. The method of claim 28, wherein the encoding algorithm comprises a data bus inversion algorithm.

30. The method of claim 28, wherein the encoding algorithm is determined by transmitting data encoding algorithm information from the first device to the second device.

31. The method of claim 28, wherein the determined data encoding algorithm is stored in a memory in the second device.

* * * * *

UNITED STATES PATENT AND TRADEMARK OFFICE
CERTIFICATE OF CORRECTION

PATENT NO.         : 8,879,654 B2                                       Page 1 of 1
APPLICATION NO.    : 12/721042
DATED              : November 4, 2014
INVENTOR(S)        : Timothy M. Hollis It is certified that error appears in the above-identified patent and that said Letters Patent is hereby corrected as shown below:

In the Claims

Column 11, line 16, in Claim 1, delete "device such" and insert -- device, such --, therefor.

Signed and Sealed this
Third Day of March, 2015

Michelle K. Lee
*Deputy Director of the United States Patent and Trademark Office*